United States Patent
Hall et al.

(10) Patent No.: US 10,603,835 B2
(45) Date of Patent: Mar. 31, 2020

(54) PIN DIE THERMOFORMING APPARATUS

(71) Applicants: David R. Hall, Provo, UT (US);
Stephen R. Hall, Draper, UT (US);
Christopher Johnson, Provo, UT (US);
Jason Simpson, Provo, UT (US);
Jedediah Knight, Provo, UT (US)

(72) Inventors: David R. Hall, Provo, UT (US);
Stephen R. Hall, Draper, UT (US);
Christopher Johnson, Provo, UT (US);
Jason Simpson, Provo, UT (US);
Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 314 days.

(21) Appl. No.: 15/427,251

(22) Filed: Feb. 8, 2017

(65) Prior Publication Data
US 2018/0222107 A1    Aug. 9, 2018

(51) Int. Cl.
*B29C 51/18* (2006.01)
*B29C 51/30* (2006.01)
*B29C 51/36* (2006.01)
*B29C 51/10* (2006.01)
*B29C 33/30* (2006.01)

(52) U.S. Cl.
CPC .......... *B29C 51/18* (2013.01); *B29C 33/302* (2013.01); *B29C 51/30* (2013.01); *B29C 51/10* (2013.01); *B29C 51/36* (2013.01)

(58) Field of Classification Search
CPC ......... B29C 51/36; B29C 51/18; B29C 51/10; B29C 2791/006; B29C 33/302; B29C 51/30
See application file for complete search history.

(56) References Cited

U.S. PATENT DOCUMENTS

| | | | | |
|---|---|---|---|---|
| 3,172,453 | A * | 3/1965 | Lauper | B21D 37/02 72/212 |
| 4,684,113 | A * | 8/1987 | Douglas | B23Q 1/035 269/21 |
| 5,065,061 | A * | 11/1991 | Satoh | H02K 5/128 310/104 |
| 5,796,620 | A * | 8/1998 | Laskowski | B29C 33/302 700/197 |
| 6,299,129 | B1 * | 10/2001 | Suzuki | H02K 26/00 251/129.09 |
| 6,700,563 | B1 * | 3/2004 | Koizumi | G01B 5/207 345/156 |

(Continued)

*Primary Examiner* — Joseph S Del Sole
*Assistant Examiner* — Jerzi H Moreno Hernandez (57) ABSTRACT

A thermoforming apparatus is described herein. The apparatus may include a pressure mechanism, a thermal device, a plurality of individually actuatable pins, and/or a pin actuation mechanism. The pressure mechanism may create a force against a die surface. The thermal device may change a thermal state of a material forced by the pressure mechanism against the die surface. The plurality of individually actuatable pins may form the die surface. The pin actuation mechanism may be connected to the plurality of actuatable pins and/or may actuate the pins. This apparatus improves on prior solutions in many ways. For example, embodiments of the thermoforming apparatus may require significantly less time between different molds than previous thermoforming machines and 3D printers.

10 Claims, 10 Drawing Sheets

(56) References Cited

U.S. PATENT DOCUMENTS

| | | | | |
|---|---|---|---|---|
| 2002/0050672 | A1* | 5/2002 | Moncavage | B23Q 1/035 269/266 |
| 2004/0262816 | A1* | 12/2004 | Parks | B29C 43/36 264/500 |
| 2007/0272219 | A1* | 11/2007 | Hill | F02M 25/0836 123/518 |
| 2008/0251975 | A1* | 10/2008 | Gallagher | B29C 33/0011 264/571 |
| 2009/0273109 | A1* | 11/2009 | Johnson | A43B 17/00 264/40.5 |
| 2010/0030362 | A1* | 2/2010 | Paik | B21D 13/02 700/110 |
| 2011/0300254 | A1* | 12/2011 | Wang | B21D 22/06 425/450.1 |
| 2015/0084237 | A1* | 3/2015 | Siagam | B29C 33/308 264/299 |
| 2015/0089791 | A1* | 4/2015 | Werner, Jr. | B23Q 3/065 29/559 |
| 2015/0352775 | A1* | 12/2015 | Geshlider | B29C 51/18 264/222 |
| 2017/0129159 | A1* | 5/2017 | Devlin | B29C 51/266 |
| 2017/0144361 | A1* | 5/2017 | Hills | B29C 51/22 |

* cited by examiner

PIN DIE THERMOFORMING APPARATUS

TECHNICAL FIELD

This invention relates generally to the field of thermoforming.

BACKGROUND

Thermoformed plastics have become a staple in the modern economy. Typical processes include heating a sheet of thermoplastic, placing the plastic on, or in, a die, pressing the plastic into the die, and cooling the plastic. Typical dies are made of ceramic and/or metal, and can only be used for a single shape; a new die must be formed for new shapes. The dies must also be exchanged in the thermoforming machine when a new shape is desired. This can be a relatively small inconvenience for machines that produce high volumes of the same object. However, there are circumstances in which it is beneficial to have a machine that can produce different-shaped objects sequentially. This was at least part of the motivation behind 3D printing. Unfortunately, 3D printing still requires relatively large time scales for each object created: hours compared to the seconds or minutes for high-volume thermoforming machines. Thus, there is still vast room for improvement in the art of thermoforming.

SUMMARY OF THE INVENTION

A thermoforming apparatus is described herein that addresses at least some of the issues described above. The apparatus may include a pressure mechanism, a thermal device, a plurality of individually actuatable pins, and/or a pin actuation mechanism. The pressure mechanism may create a force against a die surface. The thermal device may change a thermal state of a material forced by the pressure mechanism against the die surface. The plurality of individually actuatable pins may form the die surface. The pin actuation mechanism may be connected to the plurality of actuatable pins and/or may actuate the pins. This apparatus improves on prior solutions in many ways. For example, embodiments of the thermoforming apparatus may require significantly less time between different molds than previous thermoforming machines and 3D printers.

BRIEF DESCRIPTION OF THE DRAWINGS

A more particular description of the thermoforming apparatus summarized above is made below by reference to specific embodiments. Several embodiments are depicted in drawings included with this application, in which.

DETAILED DESCRIPTION

A detailed description of embodiments of a thermoforming apparatus is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the appended claims are also envisioned, as is recognized by those of skill in the art.

A thermoforming apparatus is described herein. The apparatus may include a pressure mechanism, a thermal device, a plurality of individually actuatable pins, and/or a pin actuation mechanism. The pressure mechanism may create a force against a die surface. The thermal device may change a thermal state of a material forced by the pressure mechanism against the die surface. The plurality of individually actuatable pins may form the die surface. The pin actuation mechanism may be connected to the plurality of actuatable pins and/or may actuate the pins.

The thermoforming apparatus may be suitable for forming a variety of materials. For example, in some embodiments, the material may include a thermosoftening plastic. Thermosoftening plastics, or thermoplastics as used herein, include plastics having a glass transition temperature below a melting point. The thermoplastic may be heated above the glass transition temperature by the thermal device, placed on the die surface, formed by the pressure mechanism on the die surface, and/or cooled by the thermal device on the die surface to at or below the glass transition temperature. The apparatus may also be useful in forming some pliable metallic materials.

The pressure mechanism may exert a force on the material against the die surface formed by the actuatable pins. Such mechanisms may include, in some embodiments, a vacuum. The vacuum may evacuate air disposed between the material and the die surface, resulting in a pressure differential across the material, the pressure being less on a die-side of the material than on an outwards-facing side of the material. The resulting pressure differential may force the material against the die surface. In some embodiments, the pressure mechanism may include a pressure chamber. The chamber may be formed by laying the material over the die surface and a sealing surface surrounding the die surface. A compartment may be placed over the material, forming an air-tight seal between the compartment, the material, and the sealing surface. A gas may be forced into the compartment, increasing the pressure in the compartment and on the material. The material may thereby be forced against the die surface, and may form to the die surface.

In some embodiments of the thermoforming apparatus including a vacuum as part of the pressure mechanism, a plate is included between the vacuum and the die surface. The plate may include pin apertures and vacuum apertures. The plurality of pins may pass through the pin apertures. The vacuum may be fluidically coupled to the vacuum apertures such that, as the vacuum pulls air through the vacuum apertures, the material is forced against the pins.

The thermal device may change a thermal state of the material, such as by heating and/or cooling the material. The thermal device may include heating coils, which, for example, may be used to heat a thermoplastic above the glass transition temperature. The thermal device may also include one or more fans that direct heated gas to the material. The thermal device may also include one or more combustion mechanisms, such as a burner that emits a flammable gas. The gas may be ignited as it is emitted from the burner, and may heat a chamber within which the material is disposed. The thermal device may also, or alternatively, include a cooling fan. The cooling fan may direct air and/or gas to the material to cool the material. The thermal device may include a cooled gas sprayer. The sprayer may spray liquid nitrogen onto the material. For example, the thermal device may be used to cool the material on the die to speed up setting of the material after it has been formed to the die surface.

The plurality of actuatable pins may be embodied in a variety of ways. Each pin may comprise a shank, a head, and/or one or more hollow tubes. The shank may be disposed in the tube and, together, the shank and the tube may enable actuation of the pin. For example, in some embodiments, the pin may include a set of telescoping tubes with the shank telescoping into and/or from the tubes.

In some embodiments, the shank may also be hollow. A thermal expansion fluid may be disposed within the shank. In some such embodiments, a heating element may be included corresponding to each pin. The heating element may heat the thermal expansion fluid, and the pin may actuate as the thermal expansion fluid is heated. The heating element may include any of a variety of heating elements, such as a filament encased in glass, a diode, or some other electrically resistive device. An electrical current may be passed through the heating element that heats the element. By conduction, the heating element may heat the thermal expansion fluid. The thermal expansion fluid may have a volumetric coefficient of thermal expansion at 20° C. ranging from 0.0001/K to 0.001/K. For example, the thermal expansion fluid may, in various embodiments, comprise one or more of mercury, petroleum, olive oil, paraffin oil, or glycerol. The shank may include thermal shielding that shields the thermal expansion fluid within the shank from neighboring pins' heating elements. This may allow for thermal isolation of the thermal expansion fluid and for precise control over the actuation of each pin.

The shank may have a diameter ranging as small as 0.1 mm. The tubes may have similar diameters, having inner diameters ranging as small as 0.1 mm. The diameter of the pins may correspond to a length of the pins and a density of the pins. A higher density of pins may correspond with a narrower pin diameter. A longer length of each pin may correspond with a larger diameter and/or a lower density of pins. A wide range of pin lengths are envisioned, which lengths may depend on the size of the object being formed. Additional mechanisms are also envisioned for gross movement of many sets of pins. For example, each gross movement mechanism may include a separate pin actuation mechanism and separate set of pins. Combining a plurality of gross actuation mechanisms may allow for a higher pin density while still allowing for more die depth.

The shank may include a foot having a diameter larger than the shank but smaller than or equal to the diameter of the tube within which the shank is disposed. The tube may include a lip that catches the foot and prevents the shank from leaving the tube. The foot may form a seal, such as by a gasket, with the inside diameter of the tube. Each tube in the succession of telescoping tubes may include a foot similar to the shank foot.

The pin head may form the die surface. The head may have a diameter ranging as small as 0.1 mm. In some embodiments, the pin head may have a diameter larger than the pin shank. The head may be spring-loaded and/or curved to prevent and/or attenuate dimpling in the material from the pins. Dimpling may also be attenuated by correlating the temperature the material is heated to with the pin density. For example, as thermoplastics are heated above the corresponding glass transition temperature, the surface tension (which may be inversely proportional to the material's viscosity) of the material decreases. This magnifies the effect of dimpling because, as the material becomes more pliable, it fits more snugly against the die surface, accentuating more the height difference between each pin. Where the height difference is too dramatic, and the surface tension too low, this dimpling can bleed through to the opposite side of the material from the die surface side. With a higher pin density, the force exerted on the material over each pin decreases, reducing dimpling. Thus, the pin number density may correspond to the surface tension of the material in the thermal state (e.g. temperature and viscosity) such that the surface of the material facing away from the pins remains smooth as the material is shaped on the pins.

The pins may be formed of a variety of materials and/or combinations of materials, including steel and/or plastic. The plastic material used for the pins should at least have a glass transition temperature above the temperatures expected to be experience by the pins in forming the material. For example, Teflon pins may be used to thermoform nylon. Additionally, the pins, including the heads and/or the shanks, may include a variety of cross-sectional (diameter-wise) shapes, including circular, elliptical, and any variety of polygonal shapes. The cross-section may also include a pointed ellipse. The pin heads and shanks may have the same or different shapes. For example, the pin shank may be circular and the pin head may be hexagonal.

The pin head may articulate with respect to the pin shank. For example, in some embodiments, the pin may include a spherical ball disposed between the shank and the head. The ball may be set within the shank and the shank may include a narrowing that retains the ball within the shank. The head may be connected to the ball. In this way, the head may have spherical articulation, including three spherical degrees of freedom.

The pin actuation mechanism may include the thermal expansion fluid embodiment described above. Additionally, or alternatively, the pin actuation mechanism may include a pneumatic and/or hydraulic system, more simply referred to as a "fluid actuation system" herein. The fluid actuation system may include a fluid-filled manifold having branches corresponding to the plurality of pins. Each branch may correspond to a subset of the plurality of pins, or may correspond to one of the plurality of pins. The fluid actuation system may include one or more valves corresponding to teach pin, each branch, or both. An example of such a valve may include a tube, such as a pin tube similar to those described above, a magnet, and a coil. The magnet may be rotatably disposed within the tube. For example, the magnet may have a shape matching an internal shape of the tube. The tube may have one or more pivot pins extending into the magnet that allow the magnet to rotate in the tube. The tube may also have one or more stops extending into the tube that prevent rotation of the magnet beyond the stop. A first stop may hold the magnet such that the magnet closes off the tube. A second stop may hold the magnet such that the tube remains open for fluid to flow into the tube. The coil may be wrapped around the tube and aligned with the magnet such that a current passing through the coil in a first direction rotates the magnet and closes the valve, such as by forcing the magnet against the first stop. A current passing through the coil in a second direction may rotate the magnet and open the valve, such as by forcing the magnet against the second stop, thereby allowing fluid to pass through the tube. Fluid may be forced into, and pulled from, the tubes by a piston disposed within the manifold. The piston may be actuated by, for example, an electric motor.

The thermoforming apparatus may be utilized with a robotic arm. The robotic arm may be directly connected to the apparatus or may be incorporated with the apparatus in a thermoforming system. The robotic arm may include any of a variety of tools for interacting with the material. For example, the robotic arm may include a cutting mechanism that trims the material after it is formed on the die surface. For example, the robotic arm may include a laser or a router. The robotic arm may include a suction mechanism for lifting a formed article from the die surface. The robotic arm may include various finishing tools, such as a laser, a router, an etcher, a paint sprayer, and/or an air blower, among others.

Actuation of the pins may be controlled by one or more computer processors. The processors may be coupled to hardware memory that stores software having instructions on how to actuate the pins. The software may include a coordinate location for each pin and a valve or thermal element identity corresponding to each pin. The software may also include a correlation between actuation of the pin actuation mechanism and a resultant pin height. For example, in embodiments including the thermal element, the software may store a pin height that corresponds with a temperature of the thermal fluid. Alternatively or additionally, the software may store a change in a pin height dependent on a manifold volume change and the number of valves open. The software may include instructions for receiving a three-dimensional model of a desired shape, dividing that three-dimensional model into coordinates corresponding to each pin, and associated each pin with a height. The height may be, for example, the average height of the three-dimensional model between a coordinate and its neighboring coordinates.

Figure 1:
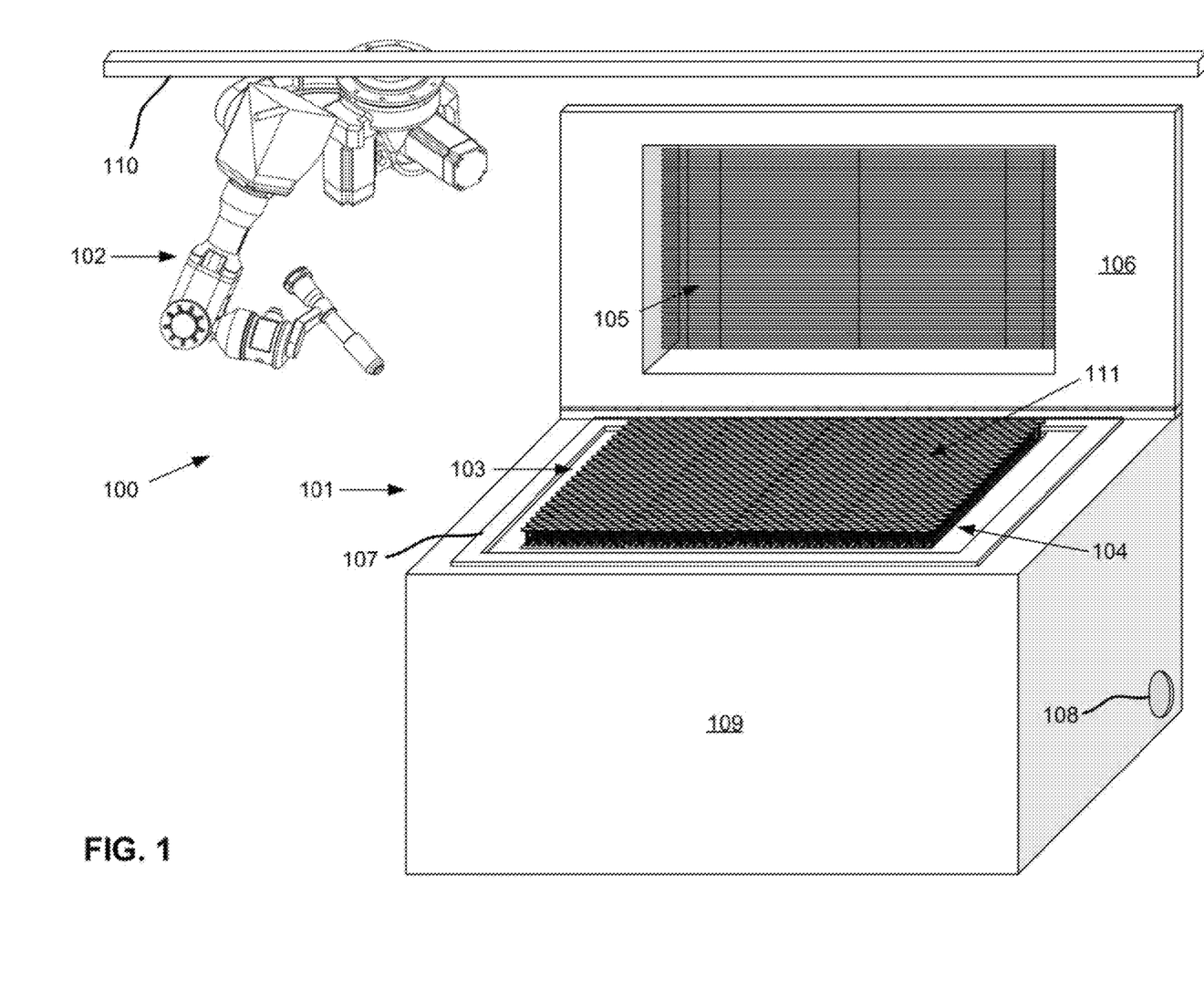
FIG. 1 depicts one embodiment of a thermoforming system.

FIG. 1 depicts one embodiment of a thermoforming system. The thermoforming system 100 includes a thermoforming apparatus 101 and a five-axis robotic arm 102. The thermoforming apparatus includes a plurality of individually actuatable pins 103, a plurality of vacuum apertures 104, heating coils 105, a lid 106, a securing bar 107, an air outlet 108, and a housing 109. The robotic arm is slidably mounted to an overhead joist 110.

Each pin may be connected to an actuation mechanism disposed within the housing. Embodiments of such actuation mechanisms are described below in more detail. The actuation mechanisms may actuate the pins in a variety of ways, such as up and down, side to side, and/or combinations thereof. The pins may form a die surface 111 upon which a material is placed and formed into a shape corresponding to the shape of the die surface formed by the pins. The vacuum apertures may be connected to a vacuum. The material may be placed on the die surface. The securing bar may be placed on the draft of the material surrounding the die surface. The lid may be brought down over the material to heat the material with the heating coils. Once a desired temperature of the material is reached, the pins may be actuated to form a desired shape. The heating coils may be turned off, and the vacuum may be turned on, pulling the material onto the die surface created by the pins.

Figure 2A:
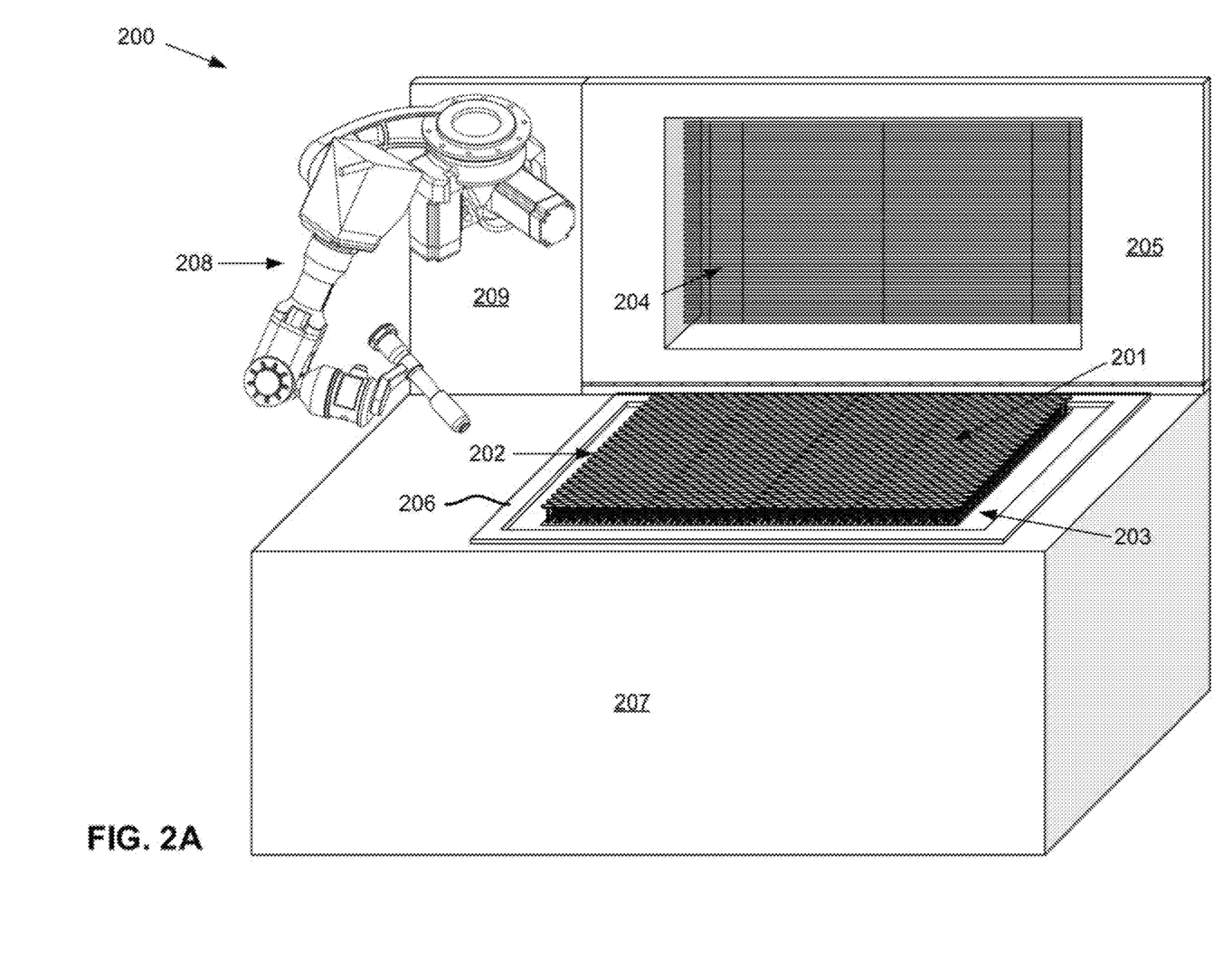
FIGS. 2A-B depict one embodiment of a thermoforming apparatus incorporating a robotic arm.
Figure 2B:
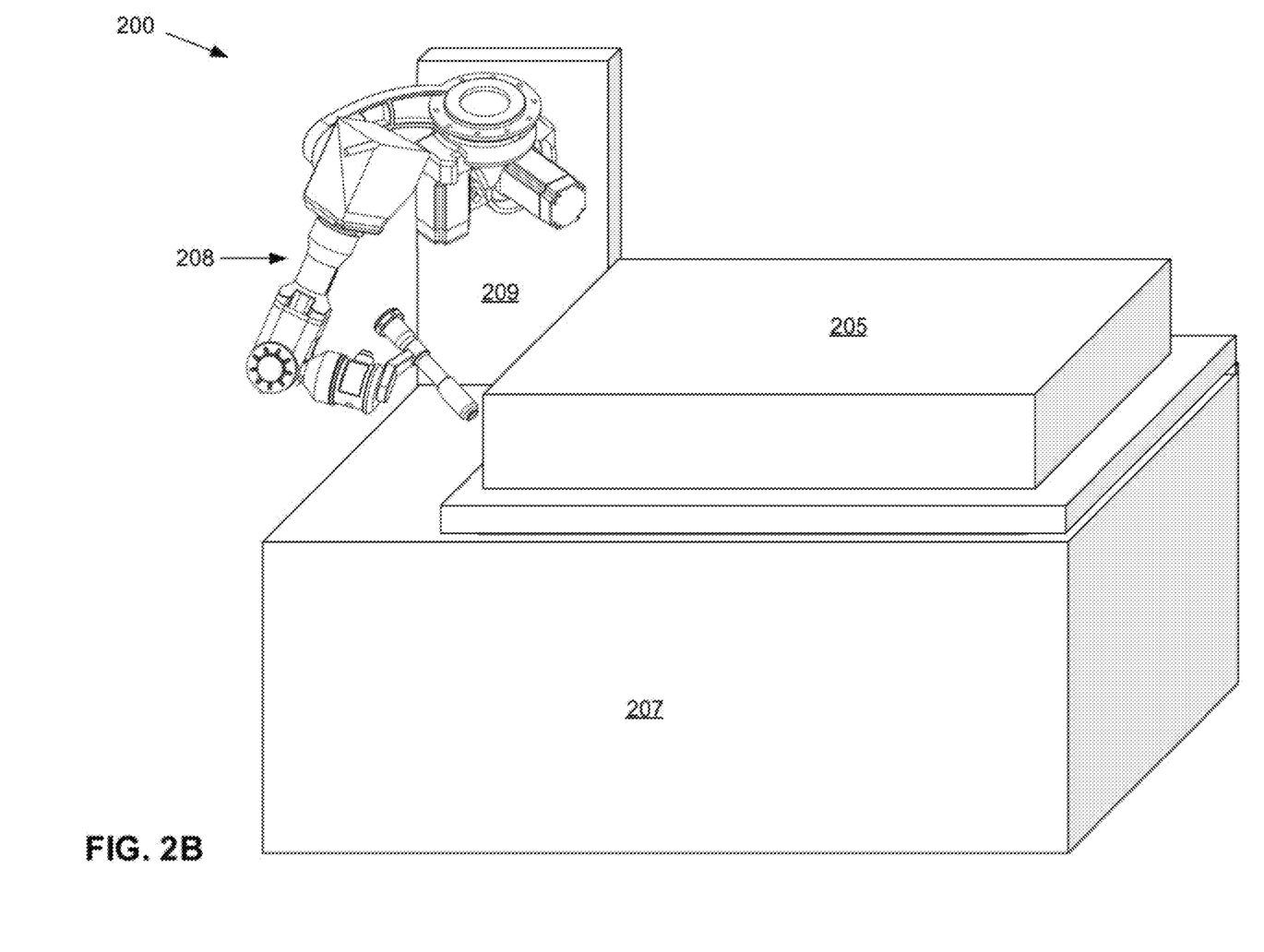

FIGS. 2A-B depict one embodiment of a thermoforming apparatus incorporating a robotic arm. The thermoforming apparatus 200 includes a die surface 201 formed by a plurality of individually actuatable pins 202, a plurality of vacuum apertures 203, heating coils 204, a lid 205, a securing bar 206, a housing 207, and a robotic arm 208. The robotic arm is rotatably mounted to a panel 209 extending above the thermoforming apparatus. The present apparatus operates similar to that described above regarding the system in FIG. 1, except the robotic arm is connected directly to the thermoforming apparatus. FIG. 2B depicts the thermoforming apparatus with the lid down so that the coils are directly over the die surface. This allows the material to be heated directly on the die surface, without requiring transport of the material.

Figure 3:
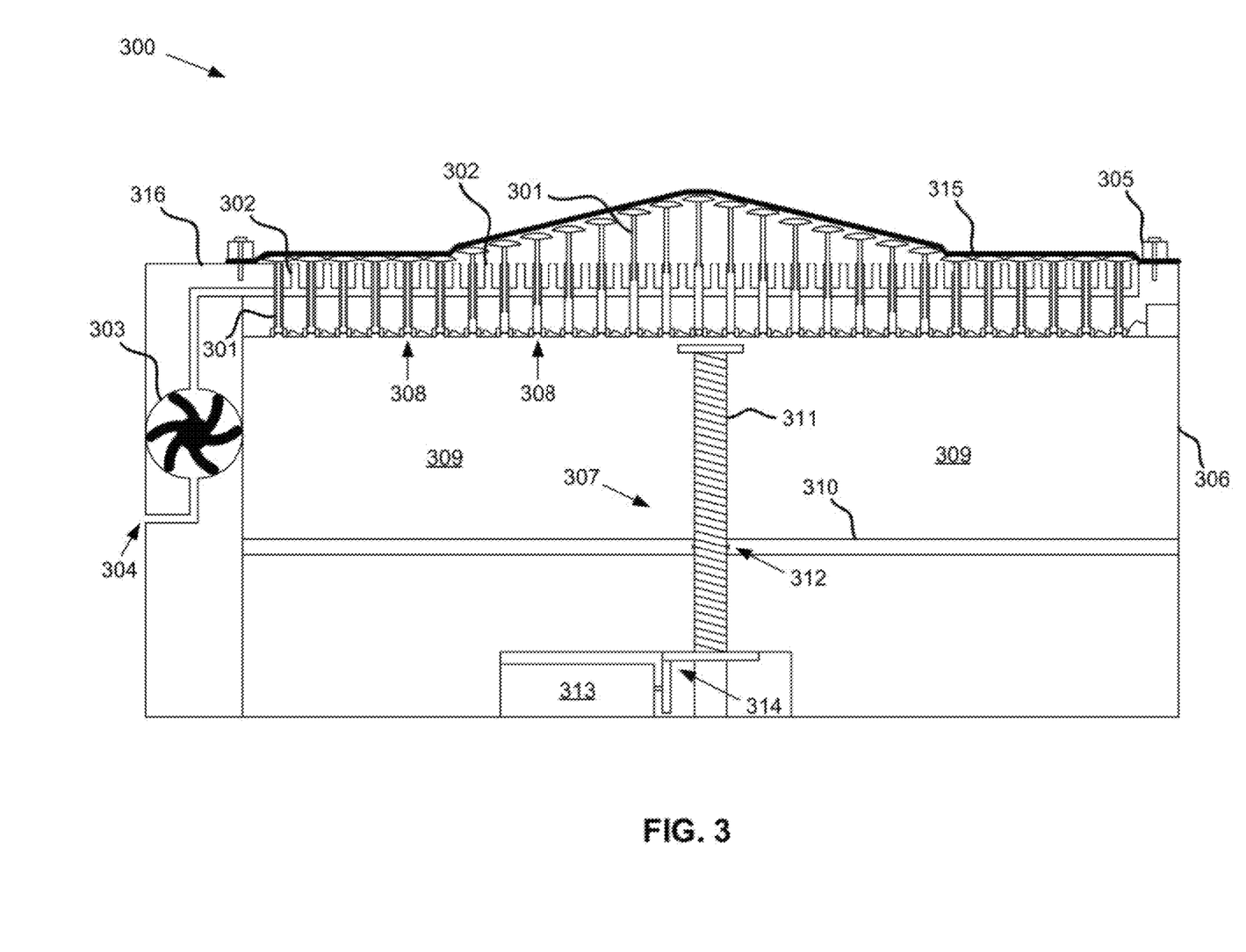
FIG. 3 depicts a cross-sectional view of one embodiment of a thermoforming apparatus.

FIG. 3 depicts a cross-sectional view of one embodiment of a thermoforming apparatus. The thermoforming apparatus 300 includes a plurality of individually actuatable pins 301 forming a die surface (such as the die surface described above with regard to FIGS. 1-2B), a plurality of vacuum apertures 302 connected to a vacuum 303, an air outlet 304, a securing bar 305, a fluid manifold 306, and a piston 307. Details of various pin embodiments are described more below with regard to other figures, but, generally, the pins may include a shank, a head, and a tube. Valves 308 are disposed between the pin tubes and the manifold. The manifold stores a hydraulic fluid 309. The piston includes a plate 310 and a rod 311. The plate forms a seal with the manifold and the rod to keep the hydraulic fluid in the manifold. The rod is threaded, and the plate is tapped 312 to correspond to the rod. The rod passes through the tap. A motor 313 rotates the rod via transmission gears 314. As the rod rotates, the plate's height adjusts. Depending on whether and how much a particular pin's corresponding valve is opened, the pin actuates along with the plate; a pin with an open valve will actuate, and a pin with a closed valve will remain at its current height.

The securing bar holds a material 315 to the die surface and forms an air-tight seal with a housing 316. The vacuum activates and pulls air between the material and the die surface through the vacuum apertures and out of the air outlet. The material is thereby forced against the die surface, forming to the shape made by the die surface.

Figure 4:
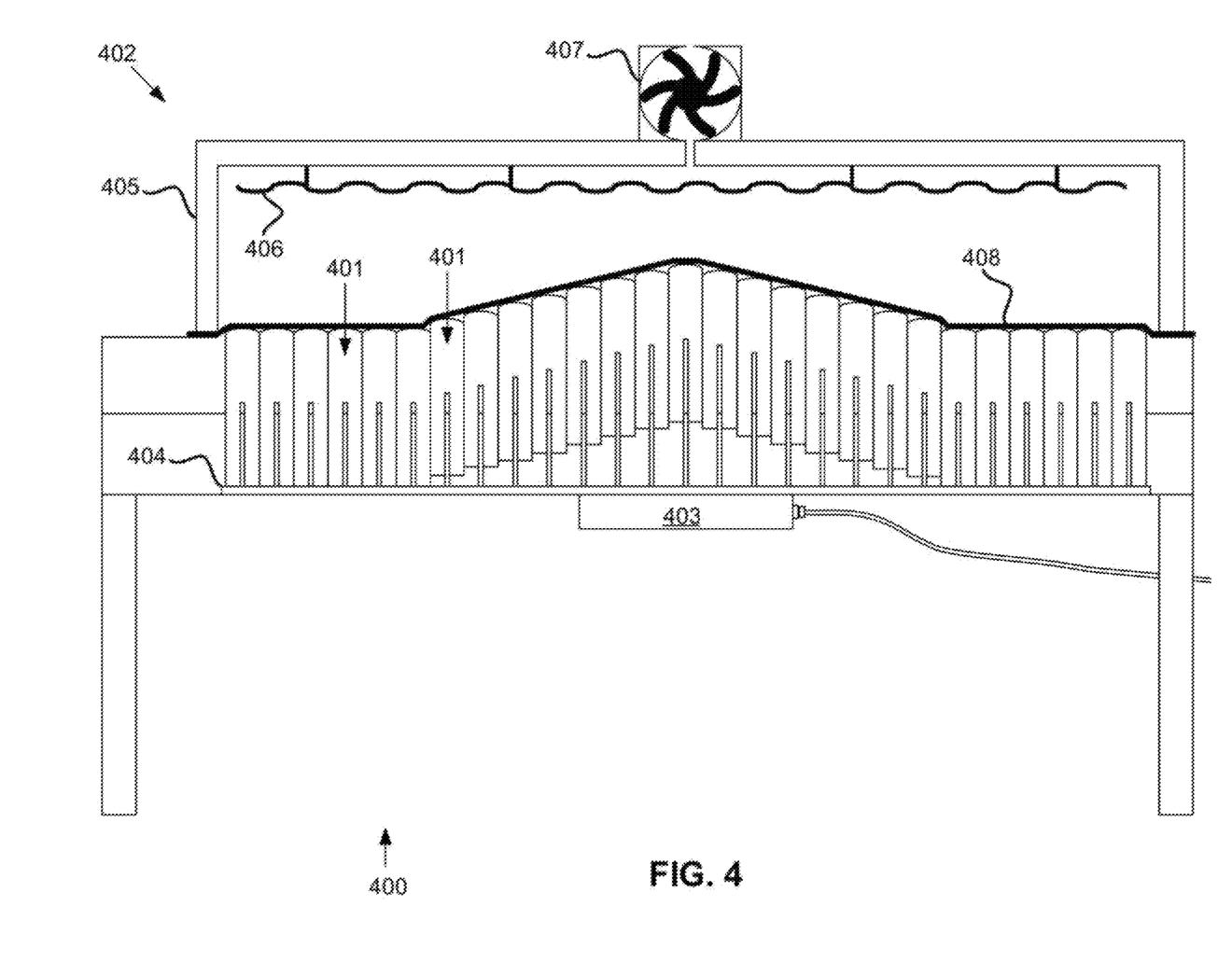
FIG. 4 depicts a cross-sectional view of another embodiment of a thermoforming apparatus.

FIG. 4 depicts a cross-sectional view of another embodiment of a thermoforming apparatus. The thermoforming apparatus 400 includes a plurality of individually actuatable pins 401 forming a die surface (such as the die surface described above with regard to FIGS. 1-2B) and a pressure chamber 402. The pins in the depicted embodiment are actuated by a thermal expansion fluid, which mechanism is described more below. The actuation mechanism includes a power adapter 403 and a circuit board 404. The circuit board provides power to each pin that heats the thermal expansion fluid. The circuit board may also provide power to one or more computer processors that execute instructions stored in hardware memory on the circuit board. The instructions may control operation of the thermoforming apparatus.

The pressure chamber includes a lid 405, heating coils 406, and a blower 407. The lid presses on a material 408 surrounding the die surface, forming an air-tight seal. The heating coils heat the material to make it pliable. The processors execute instructions to actuate the pins and form a desired shape. The blower increases the air pressure in the pressure chamber, forcing the material against the die surface.

Figure 5:
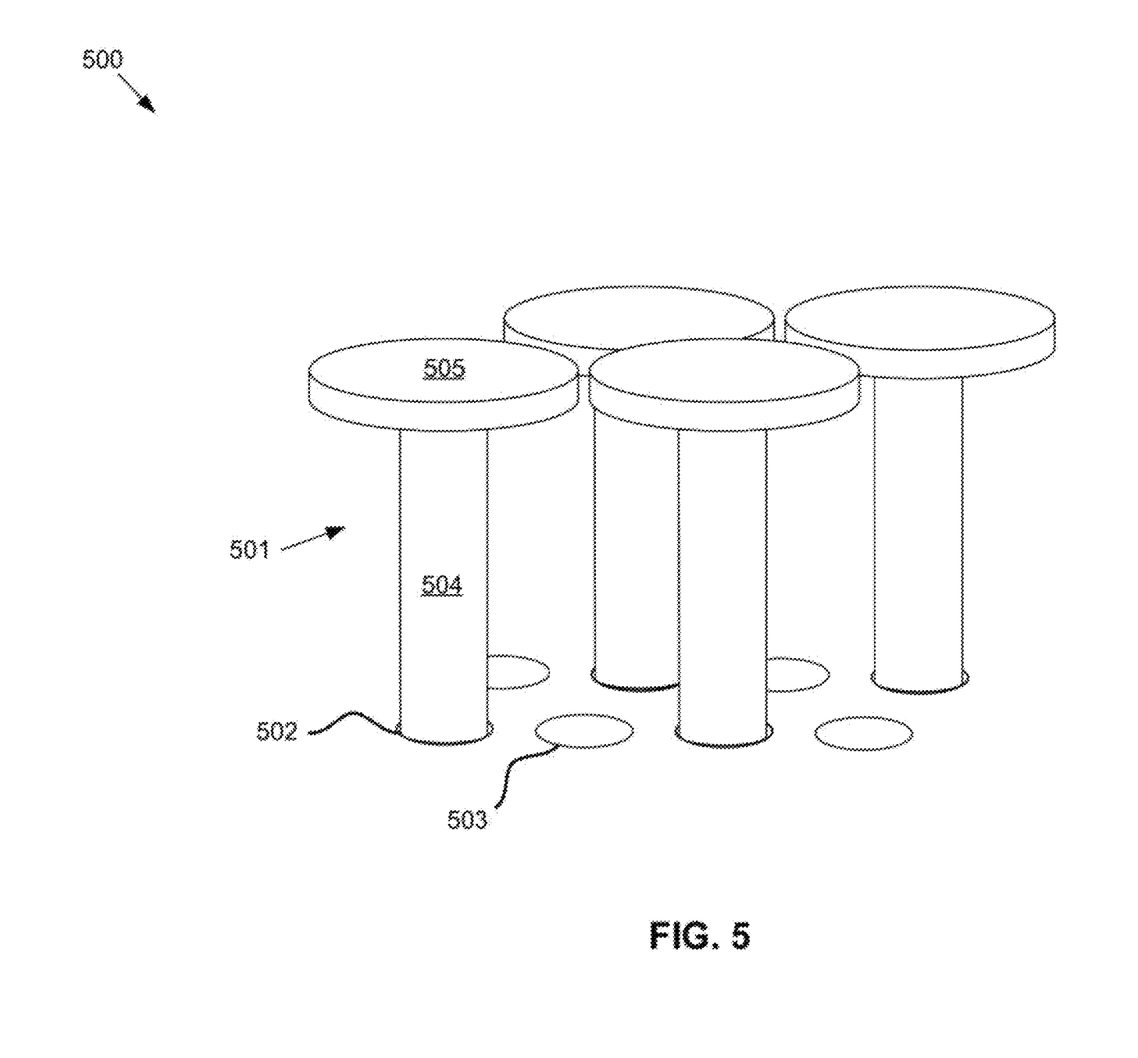
FIG. 5 depicts a zoomed-in view of one embodiment of a die surface.

FIG. 5 depicts a zoomed-in view of one embodiment of a die surface. The die surface 500 includes pins 501, pin apertures 502, and vacuum apertures 503. The pins include a shank 504 and a head 505. The pins extend through the pin apertures. As shown, the pin apertures alternate with the vacuum apertures, and the pin heads are larger in diameter than the pin shanks. The pin heads may touch each other when at the same height, but, because they are circular, will allow air to pass through to the vacuum apertures. The space between the pin heads may be small relative to the pin heads, such as less than or equal to 20%, to attenuate dimpling.

Figure 6:
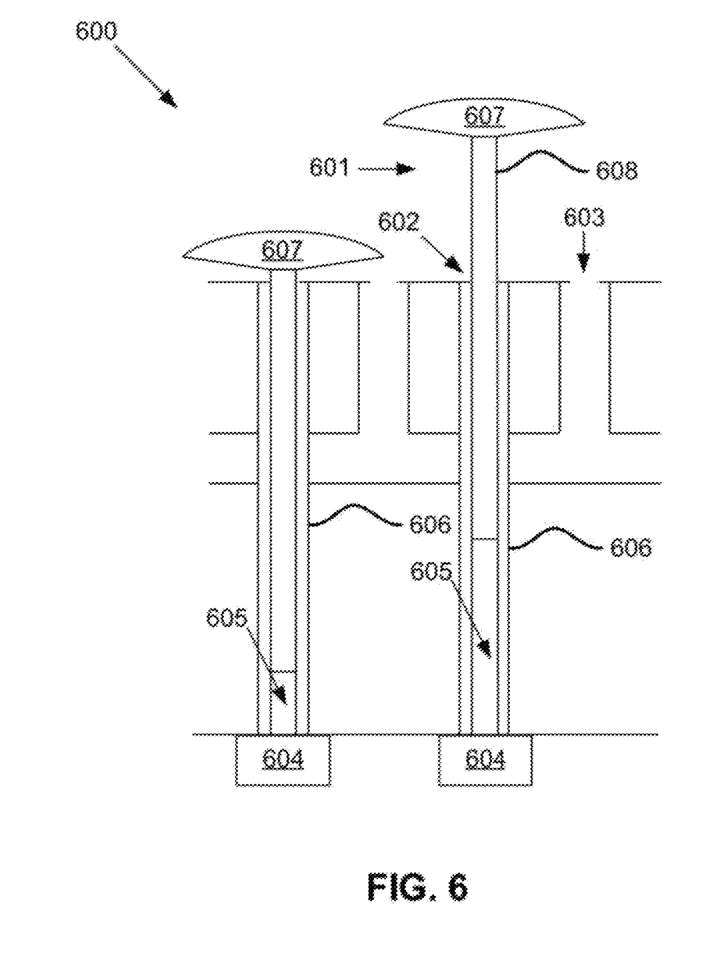
FIG. 6 depicts a zoomed-in cross-section of one embodiment of a die surface.

FIG. 6 depicts a zoomed-in cross-section of one embodiment of a die surface. The die surface 600 includes pins 601, pin apertures 602, vacuum apertures 603, heating elements 604, and a thermal expansion fluid 605 disposed in tubes 606. The pins are also disposed within the tubes. The pins include pin heads 607, shanks 608, and the tubes. As depicted, the thermal expansion fluid in the right-side pin is at a higher temperature than the thermal expansion fluid in the left-side pin, and thus the right-side pin is taller than the left-side pin.

Figure 7:
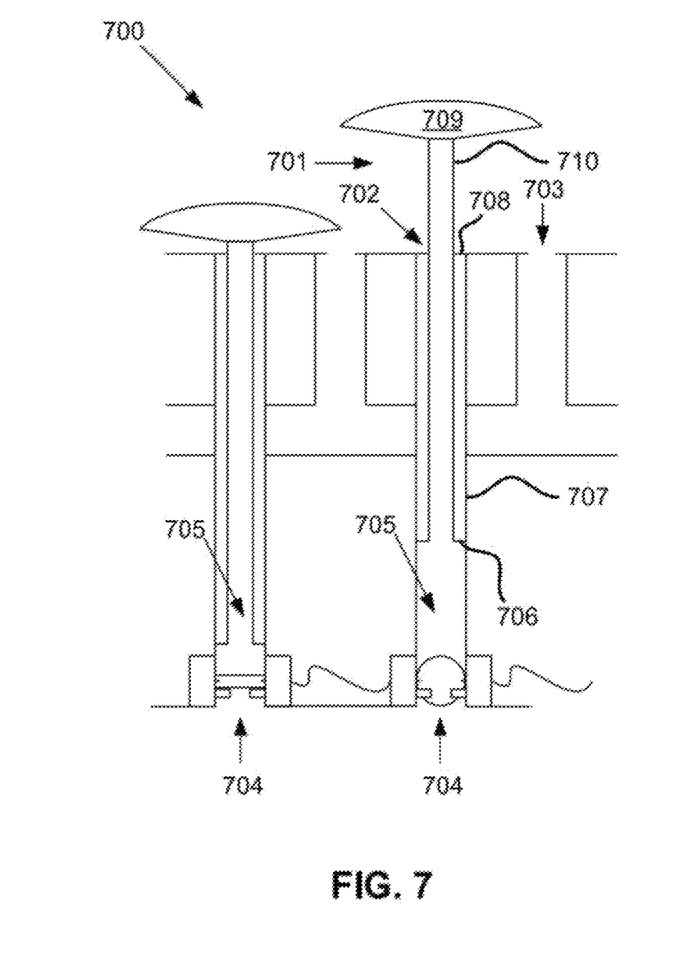
FIG. 7 depicts a zoomed-in cross-section of another embodiment of a die surface.

FIG. 7 depicts a zoomed-in cross-section of another embodiment of a die surface. The die surface 700 includes pins 701, pin apertures 702, vacuum apertures 703, and valves 704. The pins include pin heads 709 and shanks 710. As shown, the valve for the right-side pin is open, and the valve for the left-side pin is closed. Hydraulic fluid 705 fills the right-side pin, elevating it above the left-side pin. Each pin also includes a foot 706. Each pin is disposed in a tube 707 that includes a lip 708 corresponding to the foot to prevent the pins from popping out of the tubes.

Figure 8:
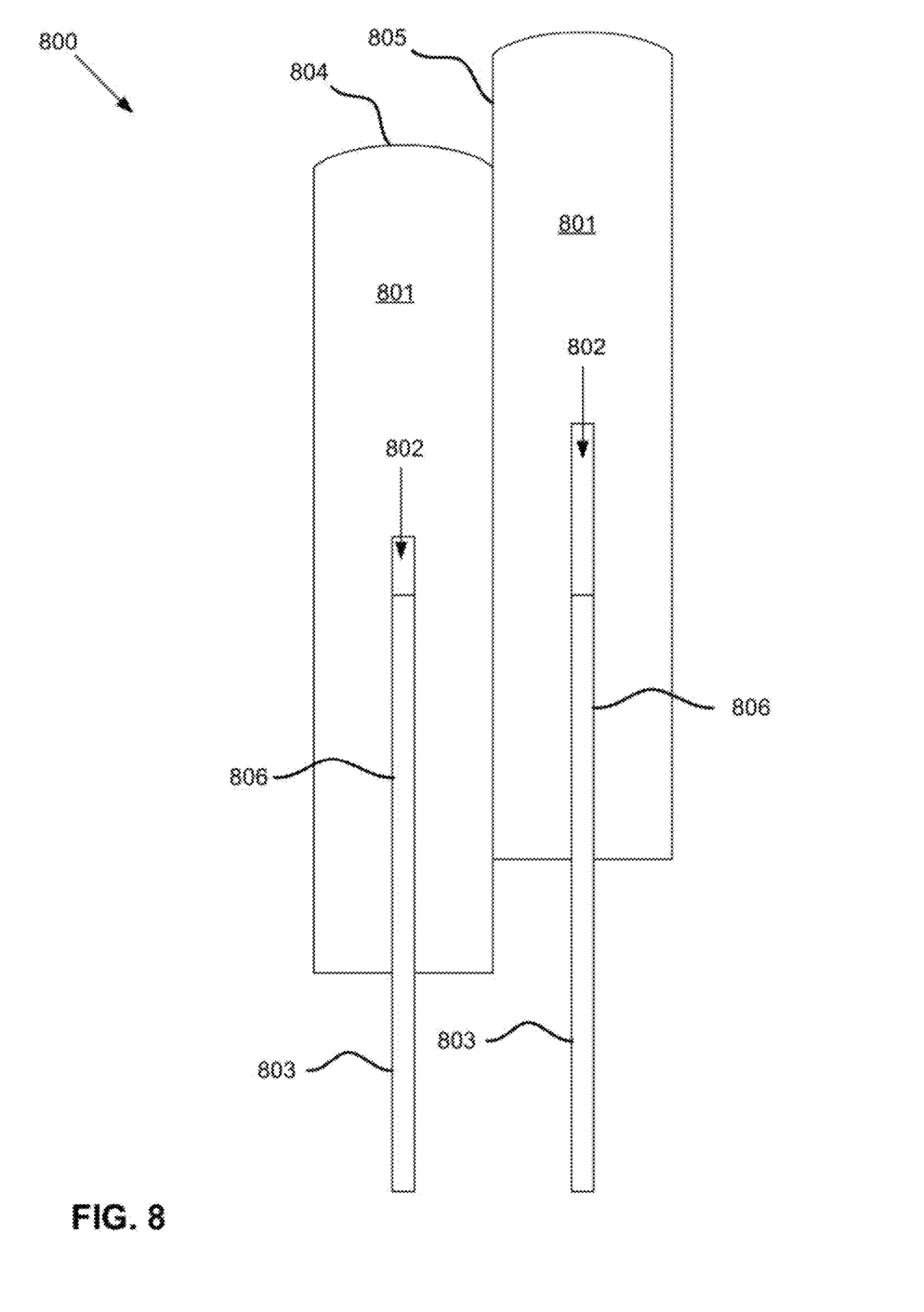
FIG. 8 depicts a zoomed-in cross-section of another embodiment of a die surface.

FIG. 8 depicts a zoomed-in cross-section of another embodiment of a die surface. The die surface 800 includes pins 801, a thermal expansion fluid 802, and thermal elements 803. The pins include pin heads 804 and shanks 805. The thermal expansion fluid is disposed within hollows 806 within the pin shanks. The pin shanks also extend over the thermal element. In some similar embodiments, only the end of the thermal element adjacent to the thermal expansion fluid heats to reduce heating of the pin and thermal bleeding to the thermal expansion fluid of neighboring pins.

Figure 9A:
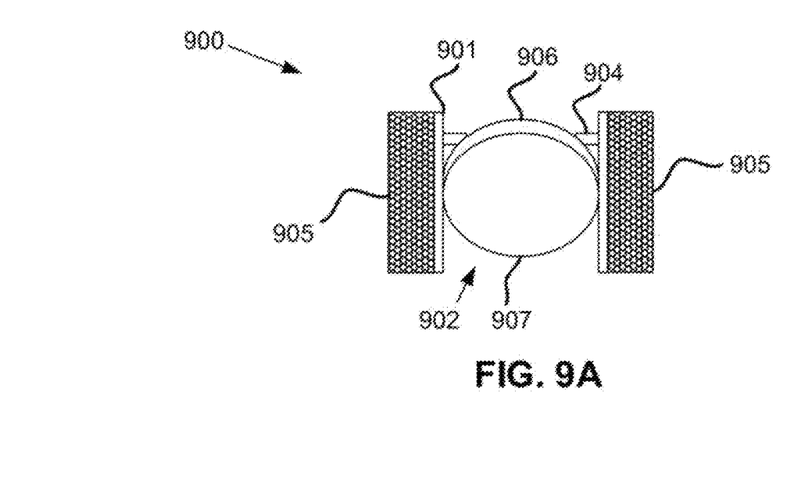
FIGS. 9A-D depict various views of a pin valve.
Figure 9B:
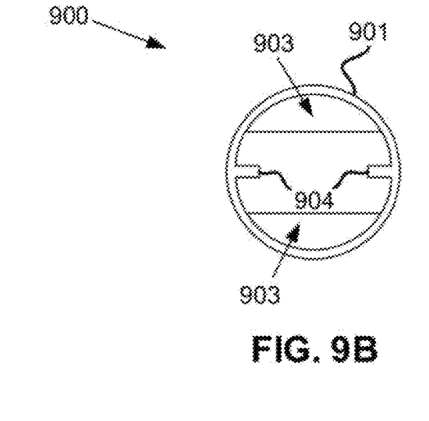
Figure 9C:
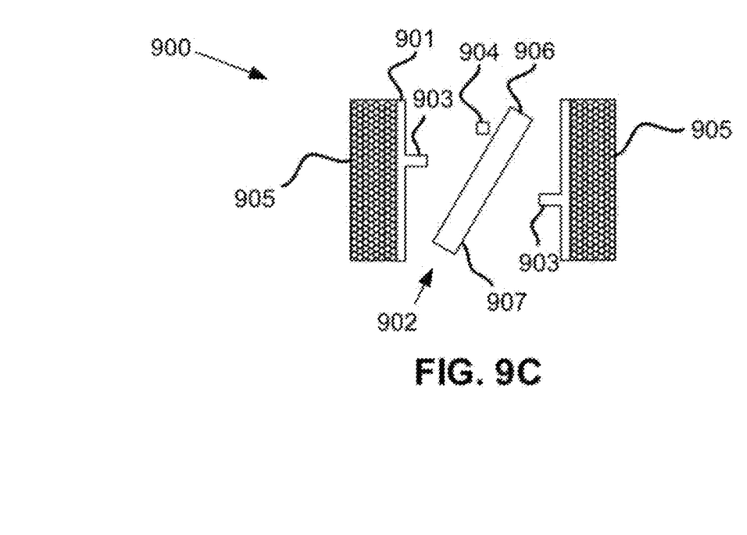
Figure 9D:
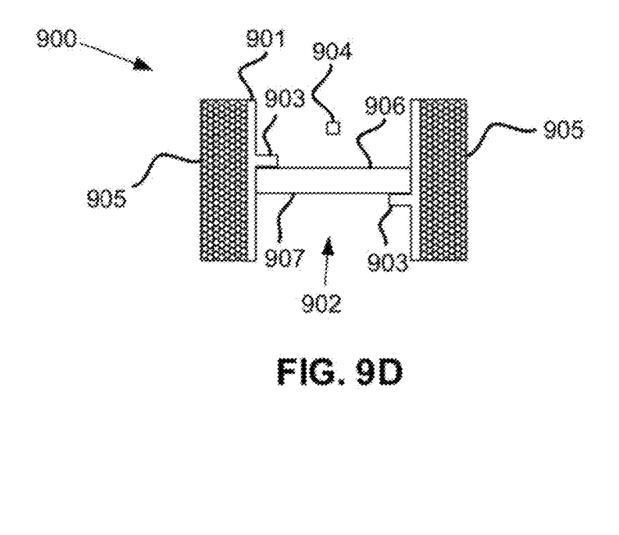

FIGS. 9A-D depict various views of a pin valve. The valve 900 includes a tube 901, a magnet 902, close stops 903, open stops 904, and coils 905. The magnet includes a north polar end 906 and a south polar end 907. FIGS. 9A and 9C-D are side views of the valve, and FIG. 9B is a top view of the valve, excluding the magnet to show both close stops, and the coils. FIG. 9A is a front side view, with one close stop cut away and the other shielded by the magnet. FIGS. 9C-D are left side views with one open stop cut away. In FIG. 9C, a current is running through the coil creating a magnetic field along the tube that aligns with the magnetic field of the magnet. This causes the valve to open, allowing fluid to pass through the valve. In FIG. 9D, the current is running the opposite direction in the coils. The magnet is forced against the close stops, closing the valve.

Figure 10A:
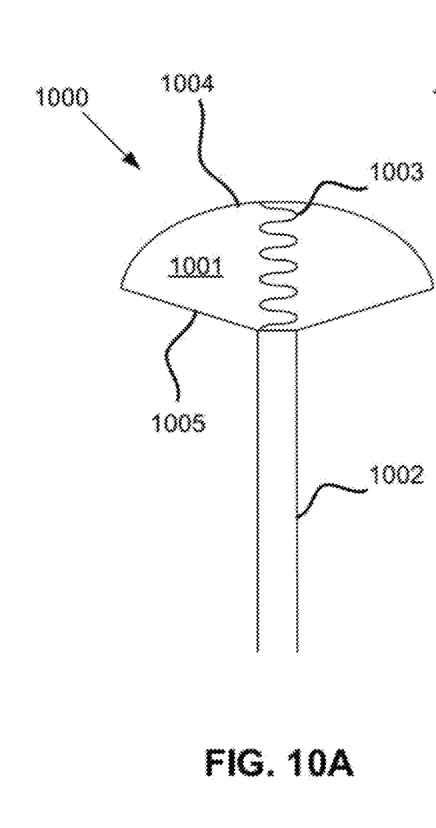
FIGS. 10A-B depict two views of a pin head embodiment.
Figure 10B:
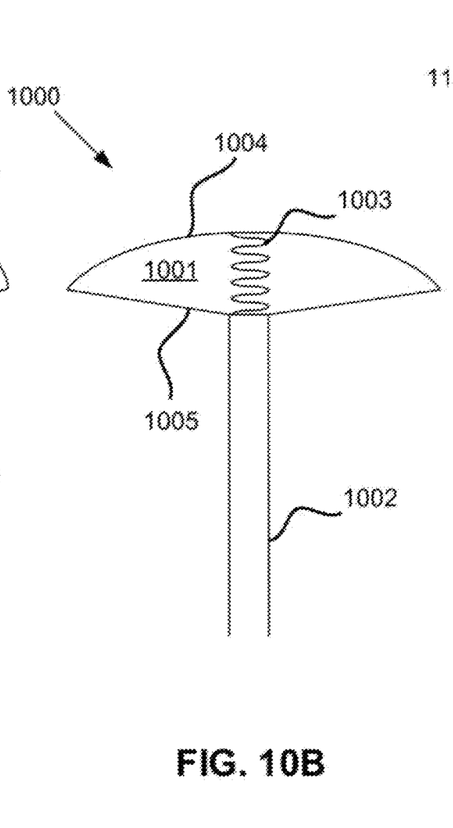

FIGS. 10A-B depict two views of a pin head embodiment. The pin head 1000 includes a head 1001, a shank 1002, and a spring 1003 disposed in the head. A top surface 1004 of the head is made of a compliant material, such as a rubber or silicone, that flexes as the spring compresses. A bottom surface 1005 of the head is made of a stiff material, such as steel. As the head compresses, the bottom surface spreads the top surface, increasing the diameter of the head. In FIG. 10A, the spring is in an equilibrium state, and in FIG. 10B the spring is compressed. Although the spring is shown in this figure as a separate element, in some embodiments the spring may be a property of the top surface or property of the combination of the top surface and the bottom surface. The spring may also/additionally be a property of the material out of which the pin head is made.

Figure 11:
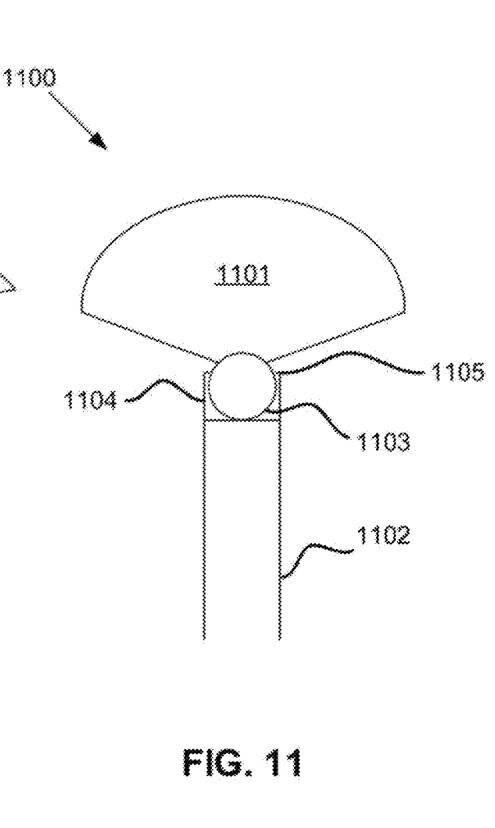
FIG. 11 depicts a view of an articulatable pin head.

FIG. 11 depicts a view of an articulatable pin head. The pin 1100 includes a pin head 1101, a shank 1102, and a ball 1103. The ball is disposed within a hollow end 1104 of the shank, and held in place by an edge 1105. The head is connected to the ball and spaced from the shank to allow for articulation of the head.

We claim:

1. A thermoforming apparatus, comprising:
   a pressure mechanism that creates a force against a die surface;
   a thermal device that changes a thermal state of a material forced by the pressure mechanism against the die surface;
   a plurality of individually actuatable pins forming the die surface; and
   a pin actuation mechanism connected to the plurality of actuatable pins,
   the pin actuation mechanism comprising a fluid-filled manifold having branches corresponding to the plurality of pins, a piston disposed within the manifold and mechanical valves corresponding to each pin, each branch, or both, wherein each valve comprises a tube, a magnet, and a coil, the magnet rotatably disposed within the tube, and the coil wrapped around the tube and aligned with the magnet such that a first current passing through the coil in a first direction rotates the magnet and closes the valve, and a second current passing through the coil in a second direction rotates the magnet and opens the valve.

2. The apparatus of claim 1, each pin having a curved head.

3. The apparatus of claim 1, each pin having a spring-loaded head.

4. The apparatus of claim 1, each pin having a head and a shank, the head having a larger diameter than the shank.

5. The apparatus of claim 1, wherein the plurality of pins comprises a pin number density, the pin number density corresponding to one or more of a surface tension or a viscosity of the material in the thermal state such that a surface of the material facing away from the pins remains smooth as the material is shaped on the pins.

6. The apparatus of claim 1, each pin comprising a hollow shank and a thermal expansion fluid disposed within the hollow shank.

7. The apparatus of claim 1, wherein the pressure mechanism comprises a vacuum, and further comprising a plate disposed between the vacuum and the die surface, the plate having pin apertures and vacuum apertures, wherein the pins pass through the pin apertures, and wherein the vacuum is fluidically coupled to the vacuum apertures such that, as the vacuum pulls air through the vacuum apertures, the material is forced against the pins.

8. The apparatus of claim 1, further comprising a robotic arm having a cutting mechanism that shapes the material.

9. The apparatus of claim 1, wherein each of the plurality of pins comprises an articulating head.

10. The apparatus of claim 1, wherein each of the plurality of pins comprises a spherically articulating head.

* * * * *